United States Patent
Cedervall et al.

(10) Patent No.: US 12,301,952 B2
(45) Date of Patent: *May 13, 2025

(54) IPTV SESSION MANAGEMENT

(71) Applicant: Telefonaktiebolaget LM Ericsson (publ), Stockholm (SE)

(72) Inventors: Mats Cedervall, Härnösand (SE); Jan Erik Lindquist, Älvsjö (SE); Andrew Mallinson, Leamington Spa (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,838

(22) Filed: Jun. 12, 2024

(65) Prior Publication Data

US 2024/0334024 A1 Oct. 3, 2024

Related U.S. Application Data

(63) Continuation of application No. 18/231,015, filed on Aug. 7, 2023, now Pat. No. 12,041,316, which is a
(Continued)

(51) Int. Cl.
*H04N 21/643* (2011.01)
*H04L 65/611* (2022.01)
(Continued)

(52) U.S. Cl.
CPC ..... *H04N 21/64322* (2013.01); *H04L 65/611* (2022.05); *H04N 21/25* (2013.01);
(Continued)

(58) Field of Classification Search
CPC .... H04N 21/25; H04N 21/254; H04N 21/258; H04N 21/25841; H04N 21/25891;
(Continued)

(56) References Cited

U.S. PATENT DOCUMENTS 6,369,855 B1 4/2002 Chauvel et al.
2003/0020671 A1 1/2003 Santoro et al.
(Continued)

FOREIGN PATENT DOCUMENTS

JP 2003209759 A 7/2003
WO 2006122024 A1 11/2006
(Continued)

OTHER PUBLICATIONS

International Search Report mailed Jul. 29, 2009 for International Application No. PCT/SE2009/050418, 4 pages.
(Continued)

*Primary Examiner* — Nicholas T Corbo
(74) *Attorney, Agent, or Firm* — Sage Patent Group

(57) ABSTRACT

A session management involves registering at least one IPTV application in a registration table so that the registration table includes at least a respective identifier of the IPTV applications. The IPTV applications are invokable at a set top box and can be so-called embedded applications and/or browser-based applications. An event requiring the invocation of an IPTV application at the set top box is detected and triggers a look-up in the registration table. The registration table is thus used as source to indicate those IPTV applications that are potentially available and can be launched at the set top box. One of the registered applications is launched for the purpose of handling the detected event.

3 Claims, 5 Drawing Sheets

Related U.S. Application Data continuation of application No. 17/687,822, filed on Mar. 7, 2022, now Pat. No. 11,778,281, which is a continuation of application No. 16/877,545, filed on May 19, 2020, now Pat. No. 11,303,971, which is a continuation of application No. 15/593,376, filed on May 12, 2017, now Pat. No. 10,701,456, which is a continuation of application No. 13/942,317, filed on Jul. 15, 2013, now Pat. No. 9,800,944, which is a continuation of application No. 12/989,416, filed as application No. PCT/SE2009/050418 on Apr. 22, 2009, now Pat. No. 8,490,143.

(60) Provisional application No. 61/049,976, filed on May 2, 2008.

(51) Int. Cl.

| | | |
|---|---|---|
| *H04N 21/25* | (2011.01) | |
| *H04N 21/254* | (2011.01) | |
| *H04N 21/258* | (2011.01) | |
| *H04N 21/262* | (2011.01) | |
| *H04N 21/27* | (2011.01) | |
| *H04N 21/43* | (2011.01) | |
| *H04N 21/443* | (2011.01) | |
| *H04N 21/45* | (2011.01) | |
| *H04N 21/47* | (2011.01) | |
| *H04N 21/478* | (2011.01) | |
| *H04N 21/4782* | (2011.01) | |
| *H04N 21/81* | (2011.01) | |
| *H04L 67/00* | (2022.01) | |

(52) U.S. Cl.
CPC ......... *H04N 21/254* (2013.01); *H04N 21/258* (2013.01); *H04N 21/25841* (2013.01); *H04N 21/25891* (2013.01); *H04N 21/262* (2013.01); *H04N 21/26216* (2013.01); *H04N 21/27* (2013.01); *H04N 21/4302* (2013.01); *H04N 21/443* (2013.01); *H04N 21/4433* (2013.01); *H04N 21/45* (2013.01); *H04N 21/4516* (2013.01); *H04N 21/4524* (2013.01); *H04N 21/4532* (2013.01); *H04N 21/47* (2013.01); *H04N 21/478* (2013.01); *H04N 21/4782* (2013.01); *H04N 21/8173* (2013.01); *H04L 67/34* (2013.01)

(58) Field of Classification Search
CPC .......... H04N 21/262; H04N 21/26216; H04N 21/27; H04N 21/4302; H04N 21/443; H04N 21/4433; H04N 21/45; H04N 21/4516; H04N 21/4524; H04N 21/4532; H04N 21/47; H04N 21/478; H04N 21/4782; H04N 21/8173; H04L 65/611
See application file for complete search history.

(56) References Cited

U.S. PATENT DOCUMENTS

| | | |
|---|---|---|
| 2003/0227567 A1 | 12/2003 | Plotnik et al. |
| 2005/0177837 A1 | 8/2005 | Mensah et al. |
| 2006/0064583 A1 | 3/2006 | Birnbaum et al. |
| 2006/0184989 A1 | 8/2006 | Slothouber |
| 2007/0217436 A1 | 9/2007 | Markley et al. |
| 2008/0111699 A1 | 5/2008 | Kwon et al. |
| 2008/0127200 A1 | 5/2008 | Richards et al. |
| 2009/0070663 A1 | 3/2009 | Fan et al. |

FOREIGN PATENT DOCUMENTS

| | | |
|---|---|---|
| WO | 2007140812 A1 | 12/2007 |
| WO | 2009134194 A1 | 11/2009 |

OTHER PUBLICATIONS

Extended European Search Report mailed Nov. 7, 2013 for European Patent Application No. EP09739075.1, 4 pages.

Alcatel, "Delivering True Triple Play—Common Capabilities for the Delivery of Composite Services", www.alcatel-lucent.com/tripleplay, Jun. 2006, 12 pages.

Alcatel, "Delivering True Triple Play—Composite Applications ad the Role of SIP", www.alcatel-lucent.com/tripleplay, Jun. 2006, 6 pages.

REGISTRATION TABLE 170

| APPL. ID | APPL. NAME | DESC. | TYPE | ICON | PRIORITY | DAE | IMS |
|---|---|---|---|---|---|---|---|
| 123456 | CHAT | S/L DESC. | IMS | URL | 0 | — | APPID, ICSI MESSAGE TYPES |
| 123457 | CHAT | S/L DESC. | IMS | URL | 1 | URL CALLBACK | APPID, ICSI MESSAGE TYPES |
| 123458 | EPG | S/L DESC. | EPG | URL | | — | — |
| ○○○ | ○○○ | ○○○ | ○○○ | ○○○ | ○○○ | ○○○ | ○○○ |

Fig. 3

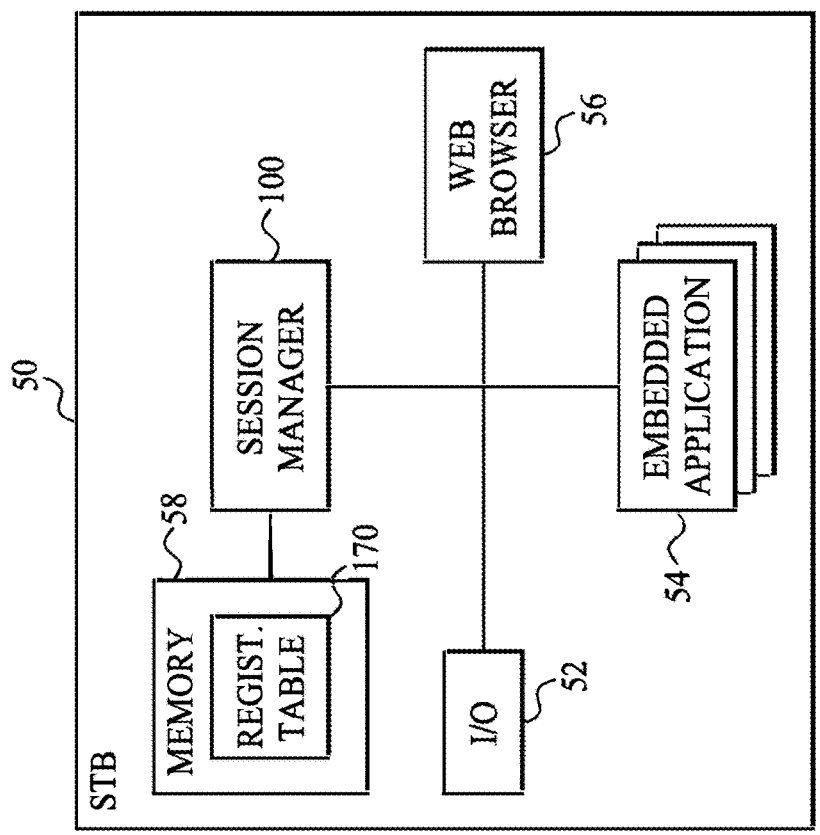
Fig. 6
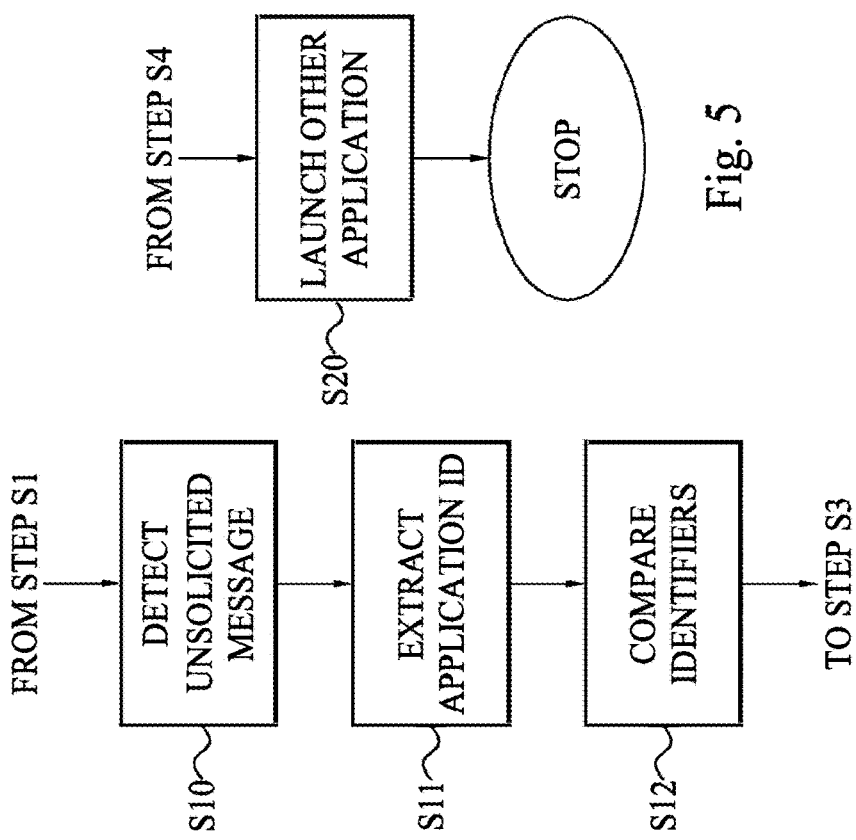
Fig. 5
Fig. 4

IPTV SESSION MANAGEMENT

CROSS REFERENCE TO RELATED APPLICATIONS

This application is a continuation of U.S. patent application Ser. No. 18/231,015, filed on Aug. 7, 2023, which itself is a continuation of U.S. patent application Ser. No. 17/687,822, filed on Mar. 7, 2022, which itself is a continuation of U.S. patent application Ser. No. 16/877,545, filed on May 19, 2020, (now U.S. Pat. No. 11,303,971), which itself is a continuation of U.S. patent application Ser. No. 15/593,376, filed on May 12, 2017 (now U.S. Pat. No. 10,701,456), which itself is a continuation of U.S. patent application Ser. No. 13/942,317, filed on Jul. 15, 2013 (now U.S. Pat. No. 9,800,944), which itself is a continuation of U.S. patent application Ser. No. 12/989,416, filed on Oct. 23, 2010 (now U.S. Pat. No. 8,490,143), which is a national stage application under 35 U.S.C. § 371 of PCT International Application No. PCT/SE2009/050418, filed on Apr. 22, 2009, which claims priority to U.S. Provisional Patent Application Ser. No. 61/049,976, filed on May 2, 2008, the disclosures and contents of which are each incorporated by reference herein in their entireties.

TECHNICAL FIELD

The present embodiments generally relate to Internet Protocol Television (IPTV), and in particular to session management in connection with IPTV.

BACKGROUND

IPTV is an emerging system where digital television and multimedia services are delivered to set top boxes present in a home environment using IP over a network infrastructure. Today, IPTV is most often associated with Video on Demand (VOD) and live TV services. However, IPTV can also provide Internet services, such as web access and Voice over IP (VOIP). Another feature of IPTV is the opportunity for integration and convergence with other multimedia services. This opportunity is affected mainly by the IP Multimedia Subsystem (IMS), providing an architectural framework for delivering IP multimedia serves in the IPTV environment. Such IMS-based services that can be used with the set top boxes include chats and different messaging services allowing IPTV users to communicate with each other.

Today, set top boxes are generally pre-equipped with IPTV-related applications that are to be invoked during IPTV sessions and include, for instance, audio players, video players, chat applications, etc. The set top boxes can further be enhanced by downloading such applications after installation at the set top boxes in the IPTV home network. In either case, the set top boxes are therefore mainly configured to effectively handle such locally installed applications, denoted embedded or native applications within the technical field. There is, though, a general need for handling other types of applications besides traditional embedded applications in the set top boxes. The set top boxes of today are, however, not configured to be able to handle such other types of applications in an efficient manner.

SUMMARY

There is, thus, a need for a technique allowing set top boxes to handle and invoke also other types of applications besides embedded applications locally installed in the set top boxes. There is specially a need to enable identification of applications available at a set top box and can be invoked therein.

It is an objective to provide an efficient session management in an IPTV home network.

It is a particular objective to provide a technique for facilitating IPTV application selection and invocation in an IPTV session.

These and other objectives are met by embodiments as defined by the accompanying claims and further disclosed herein.

Briefly, a session managing method involves registering available IPTV-related applications in a registration table accessible to a set top box. These IPTV-related applications registered in the registration tables are applications that are available at the set top box and can be launched if necessary. The IPTV-related applications can be so called browser-based or web applications that are not installed in the set top box but rather run in a web browser. Alternatively, or additionally, the applications can be embedded applications that are installed in the set top box. The registration table preferably comprises as complete information set as possible of those IPTV-related applications that are either installed in the set top box or otherwise available as browser-based applications at the set top box. The session managing method also comprises the detection of an IPTV-related event at the set top box requiring the invocation and activation of an IPTV-related application to handle the event. The registration table is then used as a look-up table by identifying those IPTV-related applications that are available for selection. Consequently, an IPTV-related application registered in the registration table is selected and preferably invoked at the set top box to manage the detected IPTV-related event Embodiments also relate to a session manager adapted for arrangement in a set top box. The session manager comprises an application register for registering IPTV-related applications available at the set top box in the registration table. An event detector is implemented for detecting any IPTV-related event requiring the invocation of an IPTV-related application.

The event detector triggers an application selector implemented for selecting an IPTV-related application, which is registered by the application register and can be invoked to manage the event detected by the event detector.

The relevant IPTV-related event could be the reception of an unsolicited message or some other unplanned and unscheduled event that requires the activation of an IPTV-related application. A further non-limiting example is the need of a currently running IPTV-related application to activate another IPTV-related application to handle one or more tasks during an ongoing session.

The registration table of the embodiments constitutes an information source that allows a set top box and its included applications and functionalities to become aware of which IPTV-related applications are available at the set top box, in particular the so-called browser-based applications that are not locally installed in the set top box but run in a web browser. The registration table enables IPTV-related applications to activate and launch each other and further provides an efficient tool for handling unsolicited messages and other unexpected events that the set top box does not expect and consequently does not have any running and waiting application that are expecting the message or event.

BRIEF DESCRIPTION OF THE DRAWINGS

The embodiments, together with further objects and advantages thereof, may best be understood by making reference to the following description taken together with the accompanying drawings, in which:

FIG. 3 is a schematic illustration of a registration table according to an embodiment;

FIG. 4 is a flow diagram illustrating additional steps of the session managing method according to an embodiment;

FIG. 5 is a flow diagram illustrating an additional step of the session managing method according to an embodiment:

FIG. 6 is a schematic block diagram of a set top box (STB) according to an embodiment.

DETAILED DESCRIPTION

Throughout the drawings, the same reference numbers are used for similar or corresponding elements.

Embodiments relates to the Internet Protocol Television (IPTV) and in particular to session management in an IPTV system or network.

Figure 1:
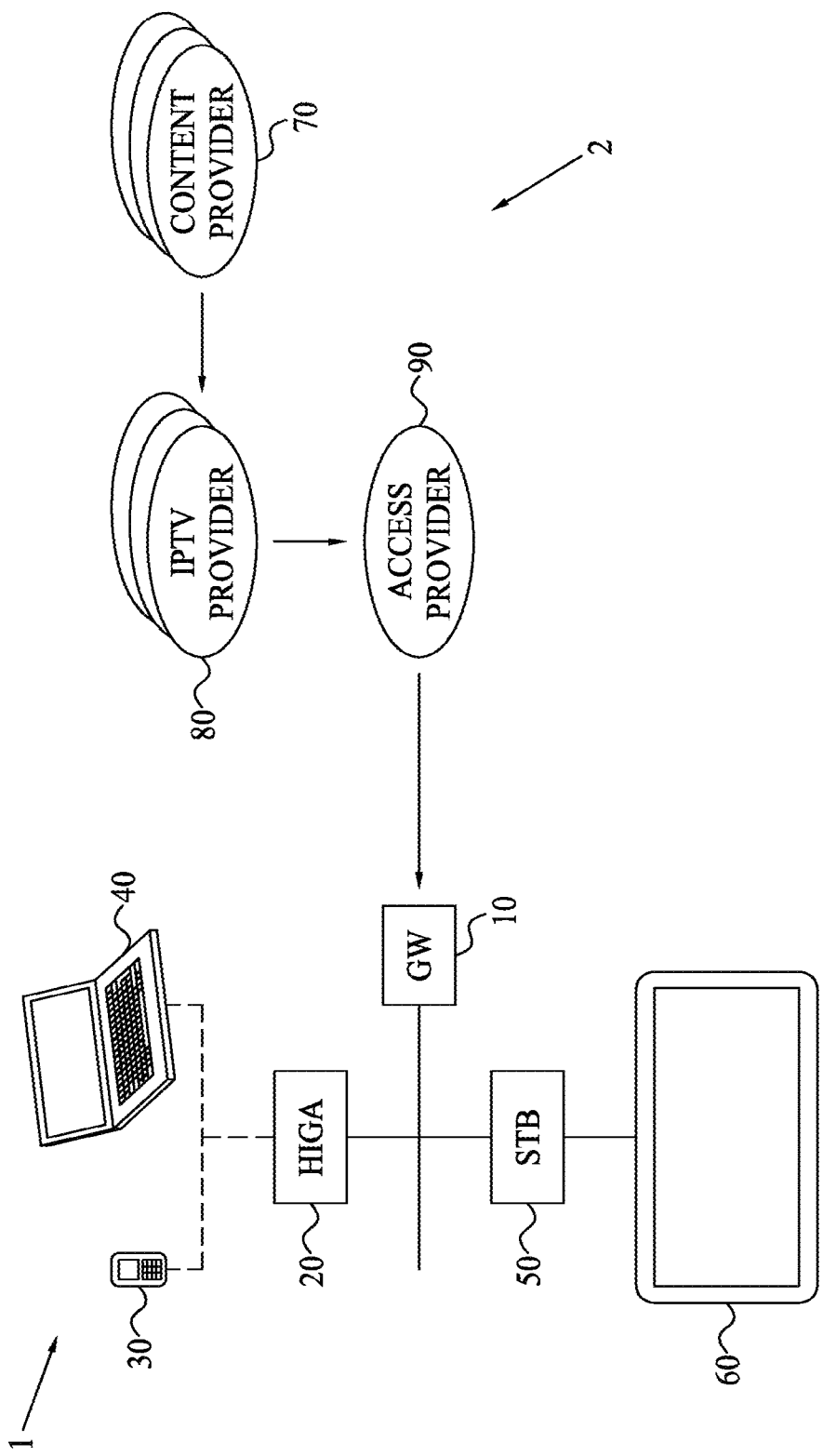
FIG. 1 is a schematic overview of an IPTV distribution network.

FIG. 1 is a schematic overview of such an IPTV system basically comprising two interconnected networks, a home network 1 and a global network 2. The global network 2 can be a managed or proprietary network operated by a network operator. Alternatively, the global network 2 is a non-managed or open network, typically denoted Open Internet in the art In either case, the global network 2 houses one or more content providers 70 having access to media content that is to be distributed to user equipment or set top boxes 50 present in the home network 1. These content providers 70 can be network-arranged, dedicated content providers or indeed represent consumer generated media in the form of media available from other users in their respective home networks.

The media is generally available to the home network 1 through one or more IPTV providers 80 and access providers 90. The former represents the network-implemented entity that provides IPTV services to the user of the IPTV system, whereas the latter provides the actual transport and access to the provided services to the home network 2.

The global network 2 illustrated in FIG. 1 should merely be seen as an illustrative example of a global network portion of an IPTV system. Other network solutions comprising more or less network entities than the ones illustrated in the figure can alternatively be used without any impact on the teachings of the embodiments. For instance, in some networks a single operator or server can take the role of all or some of the functionalities; content provider 70. IPTV provider 80 and access provider 90.

The home network 1, sometimes denoted as residential network or consumer network, can, in some embodiments, be based on Ethernet or one of the existing wire home networking technologies, such as Home Phoneline Networking Alliance (HomePNA) or the Telecommunication Standardization Sector (ITU-T) G.hn standard, which provides a possibility of creating high-speed local area network using existing home wiring.

The devices 20-60 of the home network 1 are generally interconnected to the global network 2 through a gateway (GW) 10 providing an interface between the two networks 1, 2. This gateway 10 operates in a similar way to a router in terms of forwarding data from the home network 1, such as user generated IPTV service requests, to the global network 2 and forwarding data from the global network 2, such as IPTV services and associated media, to the home network 1.

The home network 1 may optionally comprise a Home IP Multimedia Subsystem (IMS) gateway (HIGA) 20 generally managing IMS termination and interworking within the home network 1. The HIGA 20 can consequently have a wired or wireless connection to one or more IMS-capable devices 30, 40, non-limitedly represented by a mobile telephone 30 and a computer/laptop 40 in the figure.

The home network 1 further comprises one or more set top boxes (STB) 50 that are devices capable of processing and rendering the IPTV media. There is a vast number of different user equipment and user devices that can take the role of a set top box 50 in the home network 1. Some non-limiting examples include a decoder, computer, etc. having the capability of receiving media data from the IPTV provider 80 and gateway 10 and processing, i.e., decoding and rendering, the media data on an included or connected display screen 60. In contrast to traditional decoders and set top boxes in digital TV systems, in an IPTV system, the set top box 50 provides two-way communications on an IP network and allows for decoding streamed media. Also mobile devices, wirelessly communicating with the gateway 10, can operate as set top boxes according to the embodiments.

In the following, set top box 50 is used to denote any user equipment or device capable of being provided in a home network 1 and running applications for the purpose of providing IPTV services to one or more users and having functionality of processing IPTV-related media for display on a connected display screen 60, such as for the media form of video, images, text, etc., and/or play back by a connected loudspeaker, such as for the media form of audio.

IPTV should be interpreted broadly to encompass multimedia services, such as television, video, audio, text, graphics, data delivered over IP based networks to user equipment in a home network, where local processing, i.e. rendering and/or play back of the media is effected.

A set top box 50 generally comprises or is capable of running various IPTV-related applications providing IPTV services to the users. In traditional IPTV systems, these IPTV-related applications have mainly been in the form of embedded or native applications. Such embedded applications are locally installed in and run at the set top box 50. The set top box 50 can then be pre-equipped with such installed embedded applications or the application can be downloaded to the set top box 50 after installation in the home network 1. Examples of such embedded IPTV-related applications include chat applications, Electronic Program Guide (EPG) and Local Personal Video Recorder (IPVR) applications.

The trend in the field of IPTV is to complement or even possibly exchange the embedded applications with so called browser-based or web applications, often denoted as Declarative Application Environment (DAE) applications within the IPTV field. In clear contrast to an embedded application, a browser-based application is accessed via a web browser over a network, such as the Internet or an intranet. The browser-based application is generally a software application coded in a browser-supported language, such as HyperText Markup Language (HTML), JavaScript, Java, ECMAscript, etc. The browser-based application is reliant on a web browser to render the application executable.

A major advantage of browser-based applications over embedded applications is the ability to update and maintain the applications without distributing and installing software on each and every set top box 50 in the IPTV system.

Browser-based IPTV-related applications include, among others, chat applications and Network Personal Video Recorder (nPVR) applications.

Generally almost every IPTV application type can be provided both in the form of a browser-based application and as an embedded application. The latter type is typically pre-installed in the set top box and may originate from the manufacturer of the set top box or one of its partners. Browser-based applications generally have no connection to the manufacturer of the set top box but are rather more related to the IPTV service provider.

These varying types of IPTV-related applications put new demands on the set top boxes 50, in particular for cases where the same type of IPTV-related application, such as a chat application, can be available as an embedded application and as a browser-based application in the same set top box 50. Embodiments as disclosed herein effectively handle such challenges for the set top boxes 50.

Figure 2:
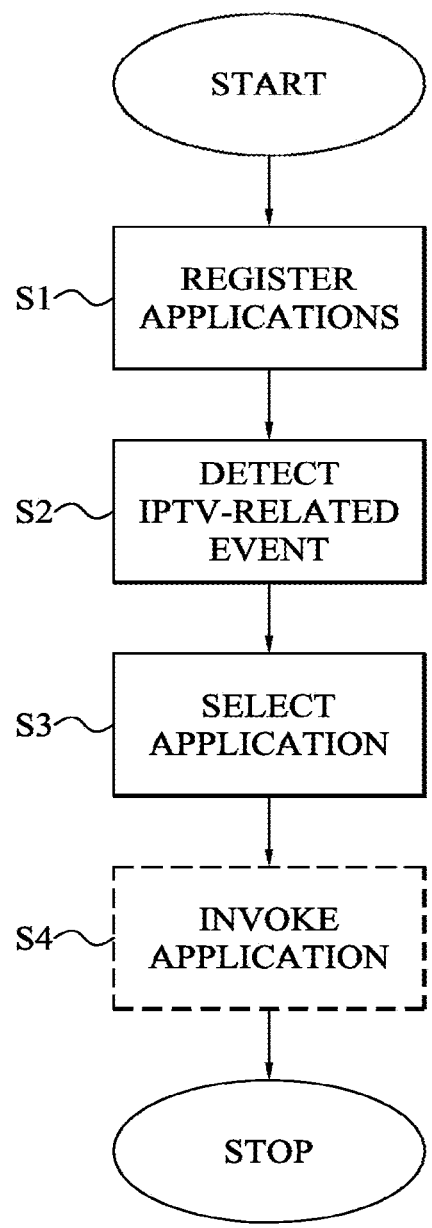
FIG. 2 is a flow diagram illustrating a session managing method according to an embodiment.

FIG. 2 is a flow diagram illustrating a session managing method according to an embodiment. The method generally starts in step S1 where at least one IPTV-related application is registered in a registration table or register present in the home network, preferably locally in the set top box. This latter implementation location for the registration table is preferred as a home network can comprise multiple set top boxes with different types of IPTV-related applications available. For a semi-remote implementation of the registration table in the home network, such as in the HIGA or a home server present in the home network, each registration table should comprise an identifier of the particular set top box it relates to.

IPTV-related applications registered in the registration table in step S1 are IPTV-related applications that can be invoked at the set top box to provide services to a user. Non-limiting examples of such IPTV-related applications include:

EPG Electronic Program Guide—an on-screen guide to IPTV content and media, allowing a user to navigate, select and discover media content, for instance, by time, title, channel, genre, etc.

login A login application that allows a new user to login to the IPTV system. It typically logs out the current user when it is being launched.

PVR Personal Video Recorder—an application that records video in a digital format to a disk drive or other memory medium.

IPVR Local PVR—a PVR application that records video content locally in the set top box or on a connected memory medium.

nPVR Network PVR—a PVR application whereby the recorded video content is stored in the IPTV Service Provider domain but allows the user to schedule recording of scheduled content programs and can later select the recorded content for rendering at the set top box.

CoD Content on Demand—an application where a user can select the individual content items they want to watch from a list of available content, including the well-known case of Video on Demand (VOD).

Scheduled Scheduled Content EPG—an application where the playout schedule is fixed by an entity other than the user and the content is delivered to the user for immediate consumption.

IMS IP Multimedia Subsystem—an application for delivering IP multimedia services to set top boxes and includes various application examples, e.g. chats, instant messaging, presence services, contact list services, etc.

The above presented examples of application types are defined by the Open IPTV Forum, release 1, but should merely be seen as illustrative examples of IPTV-related applications as defined by the invention. Thus, also other types of embedded or browser-based (DAE) applications currently not defined by the Open IPTV Forum can also be used in connection with the embodiments.

An IPTV-related application can generally be invoked and run during an ongoing IPTV session. For instance, a user watching video during a VOD session can receive a chat message from one of his/her friends during the VoD session. Alternatively, such a chat message could indeed be received and handled at the set top box outside an ongoing IPTV session by then starting a chat session, i.e. a new IPTV session, at the set top box.

The application registration in step S1 enters respective identifiers of the IPTV-related applications in the registration table. The registration table will consequently list the different IPTV-related applications that are available at the set top box, regardless of whether they are implemented locally in the set top box, i.e. embedded applications, or available in the form of browser-based applications.

The registration of the applications is advantageously conducted upon start up of the set top box or at least upon initiation of an IPTV session. Embedded applications are already present in the set top box and can consequently be registered in the registration table as a part of the firmware initialization sequence. Browser-based applications are only available once they are run in the browser environment A registration thereof can consequently be performed by including a registration script in the initial web page, such as HTML/ECMAScript page, of the accessed application.

In a preferred embodiment, step S1 is performed as a dynamic operation implying that the registration table is updated when new applications, in particular browser-based applications, become available or older applications are no longer available at the set top box. Thus, the registration table is preferably not a static list but is dynamically updated to reflect the current set of browser-based and embedded applications that can be invoked by the set top box.

In a particular embodiment, the application registration of step S1 can be conducted by an Open IPTV Terminal Function (OITF) Application Programming Interface (API) present in the set top box. In a functional language, the OITF API runs the function ID registerOITFApplication (OITFApplication) to register an IPTV-related application in the registration table. Each IPTV-related application can then be handled as a so-called OITFApplication object defined, in a particular embodiment, below.

Number ID [R] ID is a unique identifier of an application

String Appname [RW] Appname represents the name of the application, such as "EPG" or "Chatting"

String shortDescription [R] shortDescription provides a short description of the application, such as maximum 30 characters String longDescdption [R] longDescription provides a more detailed description of the application, such as maximum 255 characters String type type indicates the type of the application, examples of IPTV-related applications have been presented in the foregoing Object icon icon is an object with preferably two attributes:
: .active providing a Uniform Resource Locator (URL) to an icon when the application is active
: .inactive providing a URL to an icon when the application is inactive Boolean prioritized prioritized represents an invoker priority used to determine what application to launch when several registered applications meet the same criteria Object DAE DAE is an object that is present if the application is browser-based and preferably comprises the following two attributes:
: .callback providing a callback function that is performed when the application should be activated
: .URL representing the URL of the application and is optional if the application is already running in the declarative application environment, i.e. in a browser Object IMS IMS is an object that is present if the application is of the IMS application type and preferably comprises the following optional attributes:
: .appid representing the IMS application identifier that can be used to determine what application to launch when an IMS message arrives with a certain application identifier. Alternatively an IMS Application Reference Identifier (IARI) can be used.
: .icsi representing the IMS communication service identifier that can be used to determine what application to launch when an IMS message arrives with a certain application identifier
: .messagetypes providing an array of message types, such as Session Initiation Protocol (SIP) message types, the application handles and can be used to determine what application to launch when .appid or .icsi are not present FIG. 3 is a visual representation of a registration table 170 and the information that can be included therein for registered IPTV-related applications according to an embodiment. Consistent with the OITFApplication object presented above, the registration table 170 comprises the application identifier and preferably additional information in the form of the application name; application description, short and/or long (S/L) description; application type; icon(s) representing the active and/or passive application; a preferred invoker priority. The DAE field is preferably mandatory for browser-based applications but is preferably omitted or is empty for embedded applications. This DAE field can consequently be used as an effective and simple identifier in order to discriminate between browser-based and embedded applications. If present, i.e. for browser-based applications, the DAE field preferably comprises the callback and/or URL information described above. Correspondingly, the IMS field is preferably omitted or empty for non-IMS IPTV-related applications but is preferably mandatory for IMS applications. In the latter case, the IMS field can contain any of the above mentioned application identifier, IMS communication service identifier and message type information.

Returning to FIG. 2, once at least one application has been registered in the registration table, this table can be used for managing an IPTV session as disclosed by steps S2 and S3. The next step S2 detects an IPTV-related event requiring invocation or launching of an IPTV-related application at the set top box. Thus, the event detected in step S2 necessitates the activation of an inactive IPTV-related application or the launch or callback of an already active IPTV-related application at the set top box.

The detection in step S2 triggers the next step S3 that selects, based on and in response to the detected IPTV-related event, an IPTV-application using the registration table compiled in step S1. The application selected in step S3 is, thus, one of the IPTV-related applications registered in the registration table in step S1.

The detection of the IPTV-related event in step S2 consequently indicates the need for invoking an IPTV-related application at the set top box. In the prior art, the set top box had no indication of the different applications that were available for use on an IPTV-related event, in particular for an unsolicited or unexpected event. Furthermore, browser-based applications, possibly excluding a currently running browser-based application, would be unknown to the set top box. The prior art set top box were, in the case of a detected unsolicited event, limited to usage of any currently running IPTV-related application but had no information of any idle or inactive applications that could be invoked at the set top box.

The registration table of the embodiments solves these problems by providing a complete, relevant information source listing all active and inactive applications, preferably of both browser-based and embedded type, that can be invoked in response to the detected IPTV-related event. The registration table can, thus, be seen as a catalogue of available applications that can be selected to handle the IPTV-related event at the set top box. The particular application that is selected in step S3 can be a browser-based application or an embedded application, depending on the particular IPTV-related event and, as is further described herein, application and user preferences.

The IPTV-related application selected in step S3 based on the registration table is preferably invoked in the optional step S4 for the purpose of handling the detected IPTV-related event. The method then ends.

FIG. 4 is a flow diagram illustrating a particular embodiment of the event detecting step S2 in FIG. 2. The method continues from step S1 in FIG. 1. A next step S10 detects an unsolicited message. This message is received by the set top box and is typically forwarded thereto by the gateway and generally originates either from an IPTV network implemented device or another IPTV user. With an unsolicited message there is no active IPTV dialog or application, to which the message can be passed on. The reason is that the message is unexpected and the set top box and any currently running applications are not prepared to receive and process the unsolicited message. This means that it is not clear for the set top box, which application should be used to process the message and, as described above, which applications are available at the set top box and can be launched to process the message.

Unsolicited messages are typically IMS messages, such as chat requests or messaging services. These messages generally originate from another IPTV user that wants to initiate a communication session with the current user using the IPTV system.

A next step S11 extracts information in the form of application identifier from the unsolicited message, typically from the header portion thereof. This extracted information enables identification of the application type that should be invoked to process the message. The information useful as application identifier can, thus, be the previously described appid, icsi, iari and/or messagetypes attributes. Other types of information that can be used for identifying an application, in particular for non-IMS applications, include the appName and type data fields mentioned above.

The extracted application identifier is then compared in step S12 to corresponding application identifiers and information present in the registration table. Preferably one or more registered applications suitable for processing the unsolicited message are identified and one of them is selected in step S3 of FIG. 2.

The registration table is consequently used as a look-up table in connection with reception of unsolicited messages or upon detection of other unsolicited IPTV-related events requiring the invocation of an IPTV-related application. The registration table therefore comprises all the information that is required in order to verify what IPTV-related applications are potentially available at the set top box and what application or which applications are suitable for handling the received unsolicited message or the detected IPTV-related event.

In some cases, there might be a conflict between multiple registered IPTV-related applications that potentially could be invoked upon detection of an IPTV-related event. For instance, and with reference to FIG. 3, a chat request might have been received at the set top box and consequently requires the launching of a chat-based IMS-application. With the set top box having the registration table 170 illustrated in FIG. 3, two such chat applications have previously been registered. A first application is an embedded application whereas the second one is a browser-based application. There is, thus, a conflict between two different IPTV-related applications that both could be invoked in order to handle the chat request. A similar situation can of course also arise if multiple embedded and/or multiple browser-based applications are registered in the registration table 170 and these applications can be used to process a same IPTV-related event.

An embodiment solves this problem by introducing the previously mentioned invoker priority as a parameter or field in the registration table 170. The invoker priority can be regarded as policies or rules defining a preferred invocation order for multiple conflicting IPTV-related applications. Thus, if it is concluded that there are multiple available registered applications that could potentially be invoked in order to process a detected IPTV-related event, the invoker priorities for these applications are investigated and compared. The IPTV-related application meeting the requirements for invocation in response to the detected event and being most prioritized as determined from the comparisons of invoker priorities is then selected and invoked to handle the event.

Different types of invoker priorities can be used and are within the scope of the embodiments. For instance, simple numerical values in the form of integers can be used as illustrated in FIG. 3. In an embodiment, the lower the priority value, the higher priority the application has. Alternatively, more prioritized applications have higher priority values. As an example, a priority value of 0 could indicate low priority. 1 indicates medium priority and 2 indicates high priority. It is anticipated that at least two priority levels are preferably present, such as high versus low, although more than two different priority levels can indeed be used.

The invoker priorities for the registered IPTV-related applications can be determined according to various embodiments. In a first example, each application has a pre-defined default invoker priority that may be set by the manufacturer or distributor of the application. These default invoker priorities are then entered in the registration table 170 when registering the corresponding applications.

Alternatively, or in addition, the user of the set top box can set invoker priorities for at least some of the IPTV-related applications available through the set top box. The user can then choose which application that should be used for different types of IPTV-related event by giving higher priority to the preferred application or applications and/or setting lower priority to less preferred applications.

The user-conducted setting or change of priorities can preferably be conducted any time to thereby give possibilities of changing previously set invoker priorities. In an embodiment, the user could be urged to give an invoker priority the first time an IPTV-application is launched or implemented in the set top box. The set priority value is then stored together with the other application specific information for the IPTV-related application. The user, though, preferably has the possibility, as mentioned above, to change previously set invoker priorities.

If an IPTV-related application does not have any default invoker priority and the user has not yet set any priority for the application, the IPTV-related application could be given a predefined invoker priority once registered in the registration table 170. Such pre-defined invoker priority preferably corresponds to a medium or low priority.

The registration table can not only be used in order to select IPTV-related application to be invoked upon reception of unsolicited messages and detection of other unplanned/unscheduled IPTV-related events. A currently running IPTV-related application can use the registration table as an information source for finding a suitable application to launch in order to handle some of the processing in a current IPTV session. For instance, during an ongoing IPTV session displaying an electronic program guide to a user, audio media is required to be played out for the user. An audio player should thereby be invoked to handle this sub-process of the IPTV session. The EPG application can request information from the registration table in order to see whether any audio player has been registered and is therefore available at the set top box. An example could be to use the function Array of OITFApplication listOITFApplications( ), which returns an array of the registered IPTV-related applications. This array is reviewed and a suitable application is selected typically based on ID, appName, type, appid, icsi, iari and/or messagetypes and launched, for instance by the following function Boolean launchOITFApplication(ID), which launches the application having the entered application identifier ID.

The registration table can even allow an embedded application to invoke or launch a browser-based application to perform certain tasks during an IPTV session. Correspondingly, a browser-based application can use the registration table to identify and launch embedded applications.

These features have up to now not been possible in the art as a currently running IPTV-related application has not been aware of any other IPTV-related applications that are available and can be activated and invoked at the same set top box.

FIG. 5 schematically illustrates the flow diagram of this feature. The method continues from step S4 in FIG. 2, where an IPTV-related application has been selected and is currently active for an IPTV-session. During the ongoing session, there is a need for at least temporarily launching another IPTV-related application for the purpose of performing some tasks during the session. The registration table is used as the information source in step S20 in order to determine which applications are available and which particular IPTV-related application that should be launched. The selected application is then invoked in step S20. Note that there may consequently be multiple IPTV-related applications running in parallel during at least a portion of the IPTV session as the applications can launch other applications that generally become active only for handling the specific task and are then deactivated once more. Any of the information fields in the registration table, such as application name, application type, DAE- and IMS-fields, can be used in order to select the appropriate application to launch as mentioned above.

FIG. 6 is a schematic block diagram of a set top box 50 or other user equipment or device suitable for arrangement and operation in a home network. The set top box 50 comprises a unit or functionality 52 for communicating with other devices in the home network, in particular the optional gateway. This unit is represented as a general input and output (I/O) unit 52 in the figure. In practice, the I/O unit 52 could be a general input and output interface for a wired connection with external and remote devices or in the form of a receiver/transmitter or transceiver for wireless connection. The set top box 50 typically comprises one or more embedded applications 54 that are generally software implemented and stored in a memory of the set top box 50. A web browser application 56 is also able to be invoked in the set top box 50 and is employed for the purpose of running browser-based applications.

A session manager 100 of an embodiment is implemented in the set top box 50 for managing the registration table 170 that is being stored in a connected memory 58. The operation of this session manager 100 is further described in connection with FIG. 7.

FIG. 6 merely illustrates the units and functionalities that are directly involved in the generation and usage of the registration table. It is therefore anticipated that additional units and functionalities may indeed be present and implemented in the set top box 50.

The units 52 and 100 of the set top box 50 may be implemented in hardware, software or a combination of hardware and software.

Figure 7:
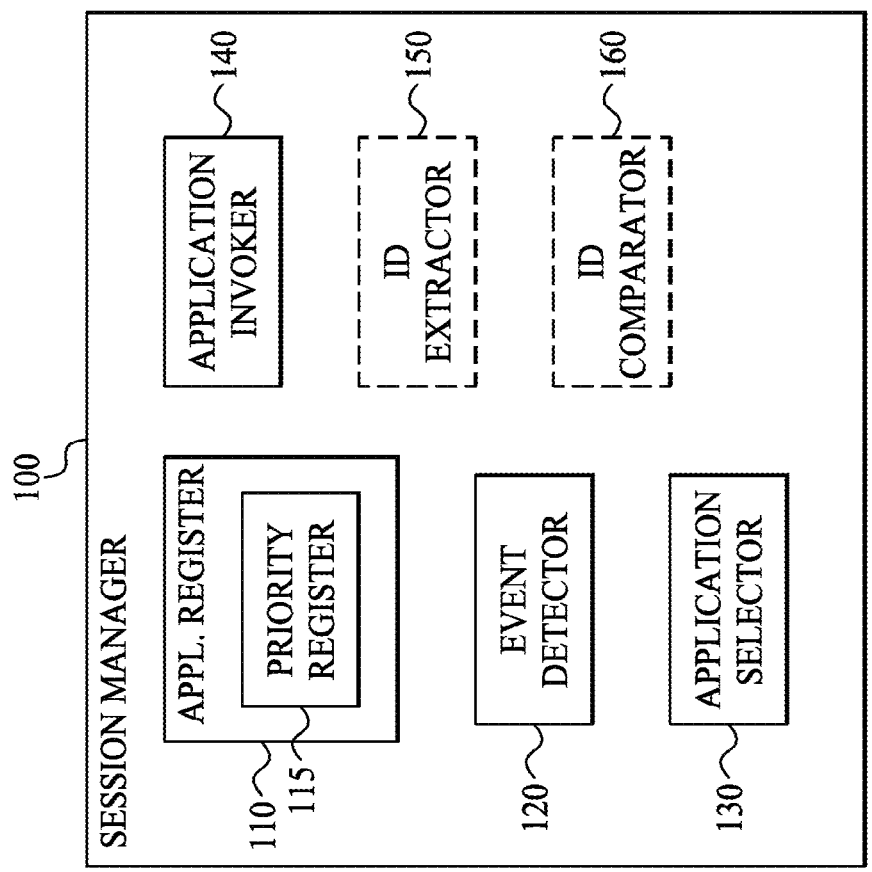
FIG. 7 is a schematic block diagram of a session manager according to an embodiment.

FIG. 7 is a schematic block diagram of a session manager 100 according to an embodiment. The session manager 100 comprises an application register 110 for registering at least one IPTV-related application in a registration table preferably stored in a memory of the set top box, in which the session manager 100 is arranged. Alternatively, the register-storing memory could constitute a part of the session manager 100 or indeed be provided in some other device of the home network. The application register 110 registers at least a respective identifier of the IPTV-related applications in the registration table, although it is generally preferred to include additional descriptive information as discussed above and illustrated in FIG. 3. The application register 110 may constitute a so-called DAE API having the functionality of registering DAE applications, i.e. browser-based applications, and preferably also embedded applications. The registration table is then advantageously implemented locally in the OITF. The registration of the applications is preferably performed at OITF start up. For embedded applications, this may be part of the OITF system firmware initialization sequence and for DAE applications, the registration scripts may be included in the initial HTML/ECMAScript page of the accessed application from an IPTV application function. This approach allows for new DAE applications to be introduced in the registration table and for existing ones to be removed by updating the IPTV application initial page. Preferably, the addition or removal of applications can be effected when the OITF is restarted.

An event detector 120 is preferably present in the session manager 100 for the purpose of detecting an IPTV-related event requiring invocation of an IPTV-related application at the set top box. This detected event can advantageously be the reception of an unsolicited message from a global network connected to the home network comprising the set top box and the session manager 100. A further example is the detection of the need of a currently running IPTV-related application for launching another IPTV-related application during an ongoing session. The event detector 120 triggers an application selector 130 to look-up the registration table maintained by the application register 110 in order to select a registered IPTV-related application that can be invoked in order to handle the detected IPTV-related event.

An optional but preferred application invoker or launcher 140 is provided for invoking the IPTV-related application selected by the application selector 130 among the once registered in the registration table.

The session manager 100 optionally comprises an identifier extractor 150 arranged for processing unsolicited messages. The identifier extractor 150 in particular extracts an application identifier or any other information from the unsolicited message that can be used for the purpose of identifying a suitable IPTV-related application to invoke to handle the unsolicited message. The extracted application identifier is forwarded to an optional identifier comparator 160 implemented for comparing the extracted application identifier with corresponding identifiers or information present in the registration table. The application selector 130 identifies and selects the IPTV-related application from the registration table based on the comparison conducted by the identifier comparator 160.

The application register 110 preferably comprises or is connected to a priority register 115 arranged for registering invoker priorities for the IPTV-related applications in the registration tables. The priority register 115 conducts this registration based on input information, such as user input manually entered by the user by means of a suitable input device of or connected to the set top box, e.g. a remote control, a key board, a mouse, a touch sensitive screen, etc. Alternatively, or in addition, IPTV-applications can have associated default invoker priorities in the descriptive information relating to the applications. The priority register 115 then fetches the information there from and enters it in the registration table. Additionally, if no input information is available for an IPTV-related application, the priority register 115 can be pre-configured to set a pre-defined invoker priority value to that particular application.

The entered invoker priorities are used by the application selector 130 in the case of multiple alternative applications that could be invoked in response to an IPTV-related event detected by the event detector 120 as previously described.

The units 110 to 160 of the session manager 100 may be implemented in hardware, software or a combination of hardware and software. The units 110 to 160 may all be implemented in the IPTV session manager 100. Alternatively, a distributed implementation with at least one of the units provided elsewhere in the set top box comprising the IPTV session manager 100 is also possible.

For a software implemented embodiment, the session managing functionality may be embodied on a computer-readable medium or memory, such as a hard drive of a computer or other set top box, ROM, RAM.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

What is claimed is:

1. A session managing method by a mobile device, the method comprising:
    registering, in a registration table of the mobile device, an identifier for a natively executable, non browser-based embedded application that is installed at the mobile device;
    registering, in the registration table, an identifier for a browser-based application in the mobile device that is executed in combination with and communicates data through the web browser of the mobile device;
    detecting a multimedia service-related event requiring invocation of an application at the mobile device during a multimedia service-session; and
    invoking one of the browser-based application or the non browser-based embedded application based on content of the registration table indicating that both the non browser-based embedded application and the browser-based application can be invoked to process the multimedia service-related event.

2. A computer program product comprising a non-transitory computer-readable medium storing program code that when executed by a processor of a mobile device performs operations comprising:
    registering, in a registration table of the mobile device, an identifier for a natively executable, non browser-based embedded application that is installed at the mobile device;
    registering, in the registration table, an identifier for a browser-based application in the mobile device that is executed in combination with and communicates data through the web browser of the mobile device;
    detecting a multimedia service-related event requiring invocation of an application at the mobile device during a multimedia service-session; and
    invoking one of the browser-based application or the non browser-based embedded application based on content of the registration table indicating that both the non browser-based embedded application and the browser-based application can be invoked to process the multimedia service-related event.

3. A mobile device comprising:
    at least one processor; and
    at least one memory storing program code that when executed by the at least one processor causes the at least one processor to perform operations comprising:
    registering, in a registration table of the mobile device, an identifier for a natively executable, non browser-based embedded application that is installed at the mobile device;
    registering, in the registration table, an identifier for a browser-based application in the mobile device that is executed in combination with and communicates data through the web browser of the mobile device;
    detecting a multimedia service-related event requiring invocation of an application at the mobile device during a multimedia service-session; and
    invoking one of the browser-based application or the non browser-based embedded application based on content of the registration table indicating that both the non browser-based embedded application and the browser-based application can be invoked to process the multimedia service-related event.

* * * * *

UNITED STATES PATENT AND TRADEMARK OFFICE
CERTIFICATE OF CORRECTION

PATENT NO. : 12,301,952 B2
APPLICATION NO. : 18/740838
DATED : May 13, 2025
INVENTOR(S) : Cedervall et al.

It is certified that error appears in the above-identified patent and that said Letters Patent is hereby corrected as shown below:

On the Title Page

On page 2, in Item (56), under "OTHER PUBLICATIONS", in Column 2, Line 6, delete "ad" and insert -- and --, therefor.

In the Specification

In Column 1, Line 7, delete "2023," and insert -- 2023 (now U.S. Pat. No. 12,041,316), --, therefor.

In Column 1, Line 9, delete "2022," and insert -- 2022 (now U.S. Pat. No. 11,778,281), --, therefor.

In Column 1, Line 11, delete "2020," and insert -- 2020 --, therefor.

In Column 1, Line 38, delete "(VOD)" and insert -- (VoD) --, therefor.

In Column 1, Line 40, delete "(VOIP)." and insert -- (VoIP). --, therefor.

In Column 1, Line 44, delete "serves" and insert -- services --, therefor.

In Column 3, Line 12, delete "embodiment:" and insert -- embodiment; --, therefor.

In Column 3, Line 31, delete "art" and insert -- art. --, therefor.

In Column 4, Line 63, delete "ECMAscript," and insert -- ECMAScript, --, therefor.

In Column 5, Line 61, delete "(VOD)." and insert -- (VoD). --, therefor.

Signed and Sealed this
Tenth Day of February, 2026

John A. Squires
*Director of the United States Patent and Trademark Office*

CERTIFICATE OF CORRECTION (continued)
U.S. Pat. No. 12,301,952 B2

In Column 6, Line 14, delete "VOD" and insert -- VoD --, therefor.

In Column 6, Line 62, delete "longDescdption" and insert -- longDescription --, therefor.

In Column 7, Line 31, delete "identifier" and insert -- identifier. --, therefor.

In Column 7, Line 36, delete "present" and insert -- present. --, therefor.